US011211836B2

(12) United States Patent
 Huang et al.

(10) Patent No.: US 11,211,836 B2
(45) Date of Patent: Dec. 28, 2021

(54) STATOR ASSEMBLY

(71) Applicant: GE AVIATION SYSTEMS LLC, Grand Rapids, MI (US)

(72) Inventors: Hao Huang, Troy, MI (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 270 days.

(21) Appl. No.: 16/402,879

(22) Filed: May 3, 2019

(65) Prior Publication Data

US 2020/0036241 A1 Jan. 30, 2020

Related U.S. Application Data

(60) Provisional application No. 62/703,922, filed on Jul. 27, 2018.

(51) Int. Cl.
| | |
|---|---|
| *H02K 1/16* | (2006.01) |
| *H02K 1/17* | (2006.01) |
| *H02K 3/12* | (2006.01) |
| *H02K 3/493* | (2006.01) |
| *H02K 21/14* | (2006.01) |
| *H02K 21/48* | (2006.01) |

(52) U.S. Cl.
CPC ............... *H02K 1/165* (2013.01); *H02K 1/17* (2013.01); *H02K 3/12* (2013.01); *H02K 3/493* (2013.01); *H02K 21/14* (2013.01); *H02K 21/48* (2013.01)

(58) Field of Classification Search
CPC ............ H02K 1/165; H02K 1/17; H02K 3/12; H02K 21/14

USPC .................................. 310/198, 210, 216.069
See application file for complete search history.

(56) References Cited

U.S. PATENT DOCUMENTS

| | | | | |
|---|---|---|---|---|
| 4,336,486 A | * | 6/1982 | Gorden | ..................... H02P 9/36 322/63 |
| 4,550,267 A | * | 10/1985 | Vaidya | ..................... H02K 3/28 310/112 |
| 5,245,238 A | | 9/1993 | Lynch et al. | |
| 5,625,276 A | | 4/1997 | Scott et al. | |

(Continued)

FOREIGN PATENT DOCUMENTS

| | | |
|---|---|---|
| CN | 2836328 Y | 11/2006 |
| CN | 107896038 A | 4/2018 |

(Continued)

OTHER PUBLICATIONS

Chinese Patent Office, Office Action re Corresponding Application No. 201910682373.4, dated Feb. 1, 2021, 10 pages, China.

(Continued)

*Primary Examiner* — Jose A Gonzalez Quinones
(74) *Attorney, Agent, or Firm* — McGarry Bair PC (57) ABSTRACT

A permanent magnet generator, includes a cylindrical rotor assembly having a set of circumferentially-spaced permanent magnets arranged at an outer radius of the rotor assembly, and spaced from one another by non-magnetic spacing element, and a stator assembly configured to coaxially receive the rotor assembly. The stator assembly includes a cylindrical stator core, a circumferentially spaced set of posts extending from the stator core and defining a set of stator slots between adjacent posts, and a set of conductive windings wound about the stator slots.

17 Claims, 6 Drawing Sheets

(56) References Cited

U.S. PATENT DOCUMENTS

| | | | |
|---|---|---|---|
| 7,256,567 B2 | 8/2007 | Kawamura | |
| 7,365,504 B2 | 4/2008 | Kroeger | |
| 7,583,063 B2 | 9/2009 | Dooley | |
| 9,793,703 B2 | 10/2017 | Urresty | |
| 2005/0029890 A1* | 2/2005 | Kadoya | B60K 6/26 |
| | | | 310/180 |
| 2005/0116675 A1* | 6/2005 | Dooley | H02K 29/12 |
| | | | 318/400.04 |
| 2009/0071784 A1* | 3/2009 | Combs | H02K 7/006 |
| | | | 192/3.21 |

FOREIGN PATENT DOCUMENTS

| | | | | |
|---|---|---|---|---|
| CN | 108054842 A | 5/2018 | | |
| EP | 33002141 A1 | 3/2018 | | |
| ES | 23258441 A1 | 9/2009 | | |
| GN | 107869038 A | 4/2018 | | |
| WO | WO-2008119864 A1 * | 10/2008 | | H02K 3/28 |

OTHER PUBLICATIONS

Taylor, P.L., "Improving Commutation in DC Machines by the Use of Flux Traps", Jul. 1970, 8 pages, Proc. IEE, vol. 117, No. 7, Manchester, England.

* cited by examiner

STATOR ASSEMBLY

CROSS-REFERENCE TO RELATED APPLICATIONS

This application claims the benefit of U.S. Provisional Patent Application No. 62/703,922, filed on Jul. 27, 2018, which is incorporated herein by reference in its entirety.

BACKGROUND

An aircraft main electric generator includes a main generator, exciter, and a permanent magnet generator (PMG). The PMG is used to power the stator of the exciter. In addition to this main electric generator PMG, additional PMGs can be utilized to power the on board aircraft flight computers. Traditionally, each such PMG is in its own mechanical package and separate from the main electric generator in order to achieve the desired fault tolerance and redundancy for human carry aircraft. The separation adds weight and occupy space in the aircraft.

BRIEF DESCRIPTION

In one aspect, the present disclosure relates to a stator assembly, including a cylindrical stator core, a circumferentially spaced set of posts extending from the stator core and defining a set of stator slots between adjacent posts, a first set of conductive windings wound about a first subset of stator slots in a first continuous circumferential portion of the stator core, and a second set of conductive windings wound about a second subset of stator slots in a second continuous circumferential portion of the stator core, and wherein the second continuous circumferential portion is different from the first continuous circumferential portion.

In another aspect, the present disclosure relates to a permanent magnet generator, including a cylindrical rotor assembly having a set of circumferentially-spaced permanent magnets arranged at an outer radius of the rotor assembly, and spaced from one another by non-magnetic spacing element, and a stator assembly configured to coaxially receive the rotor assembly. That stator assembly includes a cylindrical stator core, a circumferentially spaced set of posts extending from the stator core and defining a set of stator slots between adjacent posts, a first set of conductive windings wound about a first subset of stator slots in a first continuous circumferential portion of the stator core, and a second set of conductive windings wound about a second subset of stator slots in a second continuous circumferential portion of the stator core, and wherein the second continuous circumferential portion is different from the first continuous circumferential portion. The permanent magnet generator is configured to generate at least a first power output from the first set of conductive windings and a second power output from the second set of conductive windings when the rotor assembly is rotated relative to the stator assembly.

DETAILED DESCRIPTION

Aspects of the disclosure can be implemented in any environment, apparatus, or method for arranging, maintaining, configuring, manufacturing, or operating a permanent magnet generator (PMG) assembly, for example, in a generator, a motor, or the like.

While "a set of" various elements will be described, it will be understood that "a set" can include any number of the respective elements, including only one element. As used herein, the terms "axial" or "axially" refer to a dimension along a longitudinal axis of the generator or along a longitudinal axis of a component disposed within the generator, such as a rotor. As used herein, the terms "radial" or "radially" refer to a dimension extending between a center longitudinal axis of the generator, an outer circumference, or a circular or annular component disposed within the generator. The use of the terms "proximal" or "proximally" refers to a component being relatively closer to a referential element as compared to another component. The term "forward" used in conjunction with "axial" or "axially" refers to moving in a first direction toward a "front" of a component, while the term "aft" used in conjunction with "axial" or "axially" refers to an opposite direction toward the "rear" of a component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

While terms such as "voltage", "current", and "power" can be used herein, it will be evident to one skilled in the art that these terms can be related when describing aspects of the electrical circuit, or circuit operations. The exemplary drawings are for purposes of illustration only and the dimensions, positions, order and relative sizes reflected in the drawings attached hereto can vary.

Figure 1:
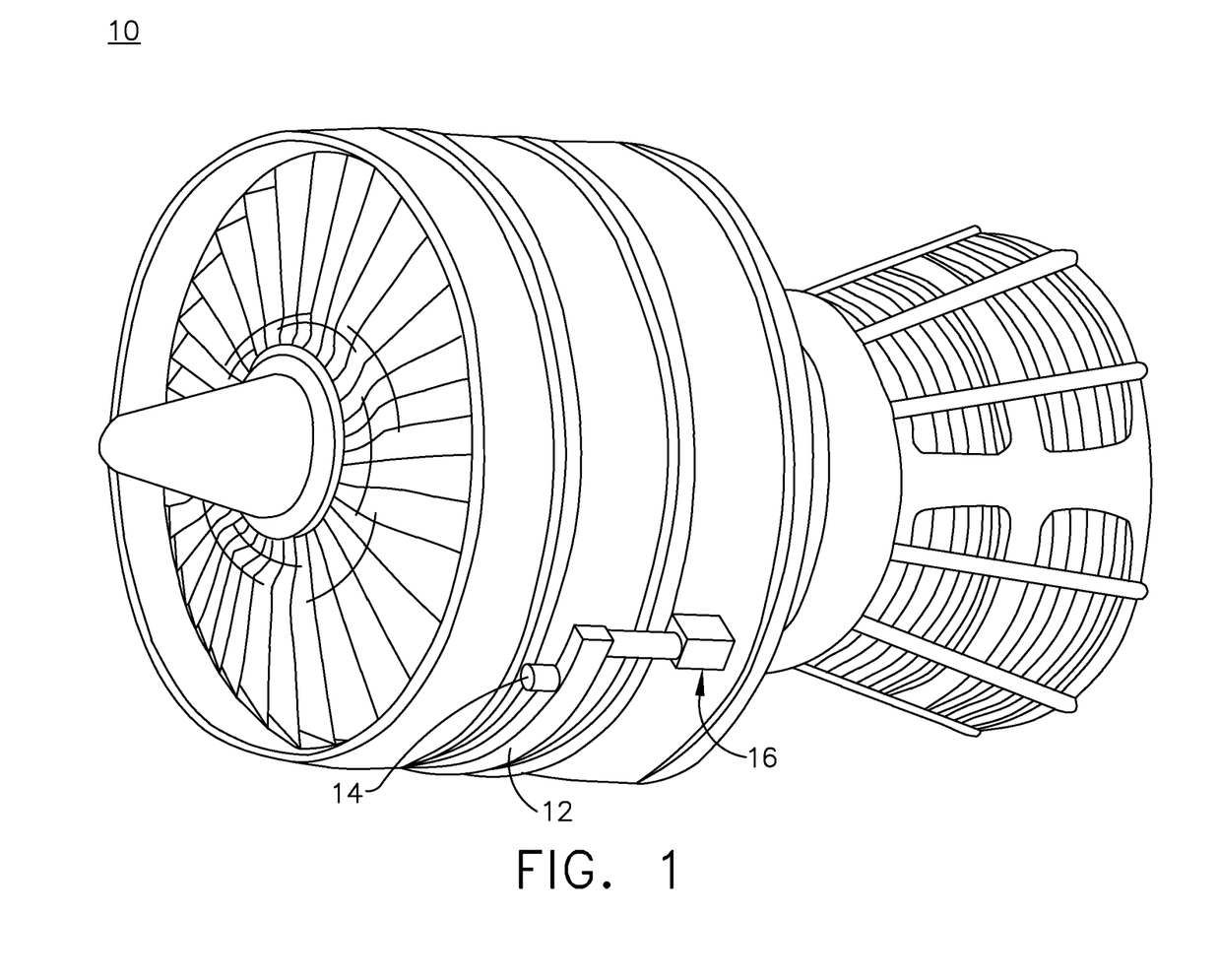
FIG. 1 is a perspective view of a gas turbine engine having a generator in accordance with various aspects described herein.

FIG. 1 illustrates a gas turbine engine 10 having an accessory gear box (AGB) 12 and a generator 14 according to one aspect of the disclosure. The AGB 12 can be mechanically coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the disclosure and will not be described further herein. It will be understood that while one aspect of the disclosure is shown and described with reference to in an aircraft environment, the disclosure is not so limited and has general application to electrical power systems in non-aircraft applications, such as other mobile applications and non-mobile industrial, commercial, and residential applications. While a generator 14 is described, aspects of the disclosure can be included a generator, motor, or any conductor, conductive wire, or set of conductive windings utilized for commercial or residential implements.

Figure 2:
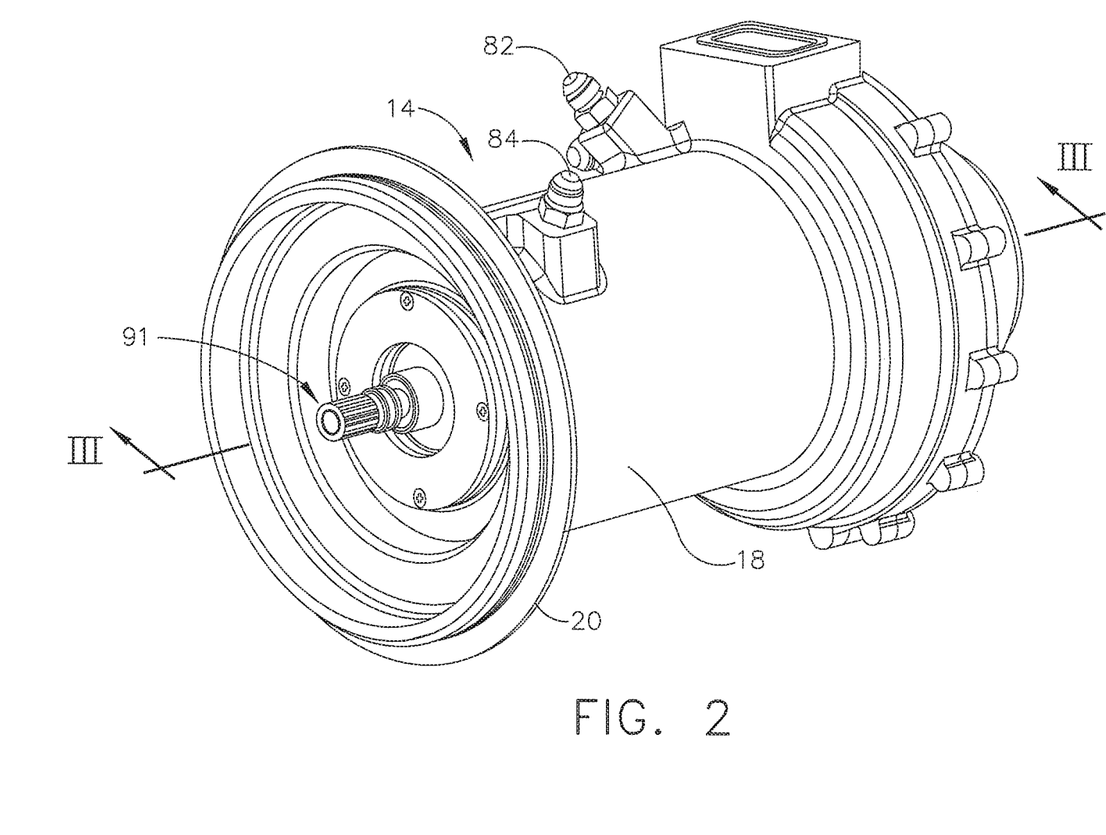
FIG. 2 is a perspective view of an exterior of the generator of FIG. 1, in accordance with various aspects described herein.

FIG. 2 more clearly illustrates a non-limiting example of the generator 14 and its housing 18, which can include a clamping interface 20, used to clamp the generator 14 to the AGB 12. Multiple electrical connections can be provided on the exterior of the generator 14 to provide for the transfer of electrical power to and from the generator 14. The electrical connections can be connected by cables to an electrical power distribution node of an aircraft having the gas turbine engine 10 to power various items on the aircraft, such as lights and seat-back monitors.

Figure 3:
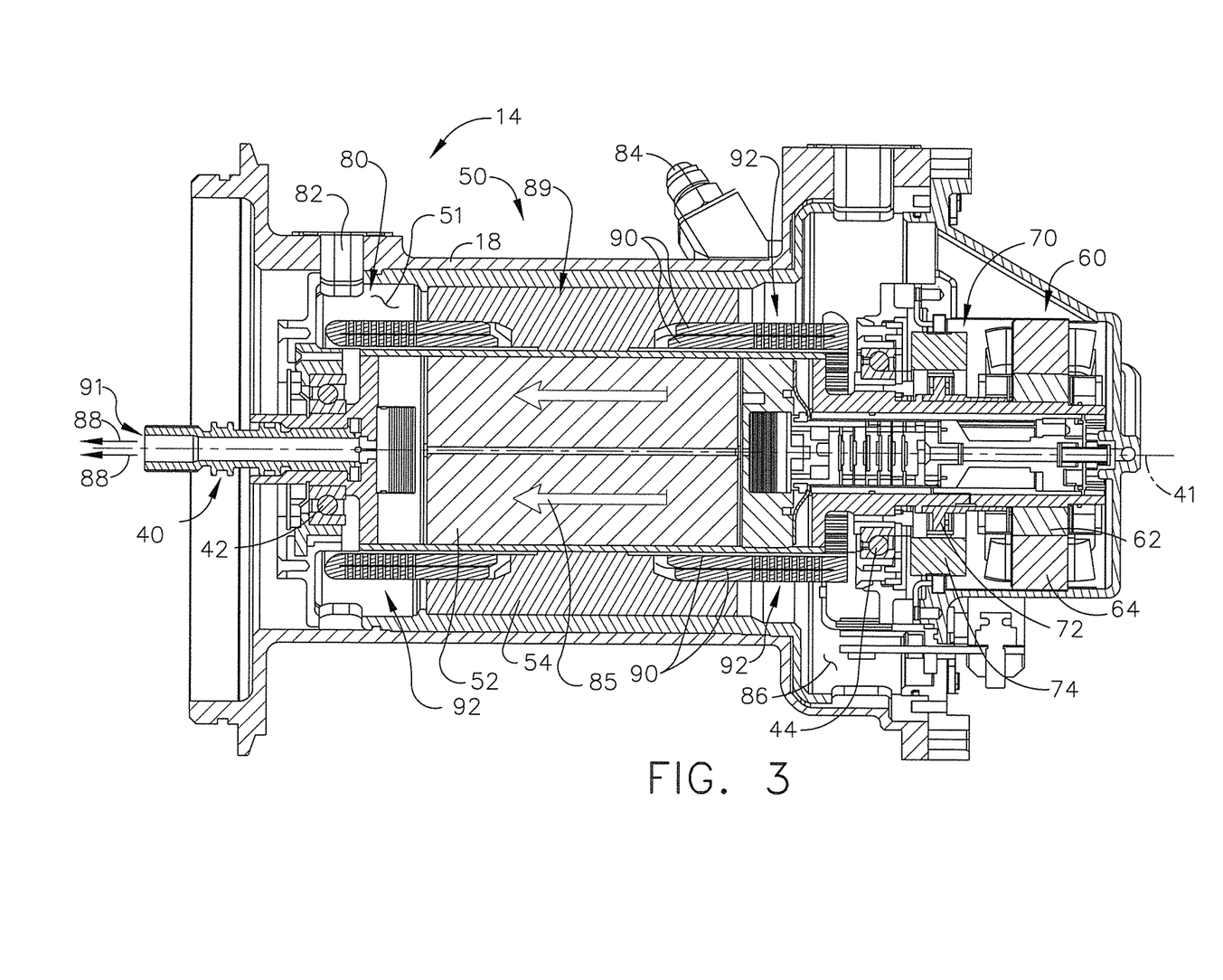
FIG. 3 is a schematic cross-sectional view of the generator of FIG. 2 having a main machine, exciter, and permanent magnet generator (PMG) assembly, in accordance with various aspects described herein.

A non-limiting example interior of the generator 14 is best seen in FIG. 3, which is a sectional view of the generator 14 of FIG. 2. A rotatable shaft 40 is located within the generator 14 and is the primary structure for supporting a variety of components. The diameter of the rotatable shaft 40 can be fixed or vary along the length of the rotatable shaft 40. The rotatable shaft 40 is supported by spaced bearings 42 and 44. Several of the components of the generator 14 have a fixed component and a rotating component, with the rotating component being provided on the rotatable shaft 40. Examples of these components can include a main machine 50, an exciter 60, and a PMG assembly 70, with the corresponding rotating component comprising a main machine rotor 52, an exciter rotor 62, and a PMG rotor assembly 72, respectively, and the corresponding fixed component comprising a main machine stator 54, an exciter stator 64, and a PMG stator assembly 74. In this manner, the main machine rotor 52, exciter rotor 62, and PMG rotor assembly 72 can include the rotatable shaft 40. The fixed components can be mounted to any suitable part of the housing 18. Each of the main machine stator 54, exciter stator 64, and PMG stator assembly 74 defines an interior through which the rotatable shaft 40 extends.

It will be understood that each of the main machine rotor 52, exciter rotor 62, and PMG rotor assembly 72 can have multiple rotor poles and that each of the main machine stator 54, exciter stator 64, and PMG stator assembly 74 can have multiple stator poles such that magnetic fields can be produced by respective components. The generator 14 can, in turn, operably generate electrical power by way of rotation of the rotatable shaft 40 relative to the fixed components through the interaction of the magnetic fields and current-carrying conductors located in the rotating or fixed components. For example, in at least one rotor pole and stator pole can be formed by a core with a post and wire wound about the post to form a winding or set of windings, with the set of windings having at least one end turn It can be seen in FIG. 3 that the main machine stator 54 includes a stator core 89 having at least one post. A set of stator windings 90 are formed when a conductor or conductive wire is wound about the post or core 89. The set of windings 90 can also include a winding segment that extends across either the front or rear of the post core 89, forming at least one end turn 92.

During power-generating operations, the rotatable rotor 40 is mechanically powered, driven, or rotated by a force, such as the mechanical energy of the engine 10, about an axis of rotation 41. The relative rotational motion of the rotatable rotor 40 and co-rotating components, including at least the main machine rotor 52, relative to the fixed or stationary stator components, including at least the main machine stator 54, generates electrical power in the set of stator windings 90 due to the interaction of the generator 14 magnetic fields. The electrical power generated in the set of stator windings 90 can be conductively connected to, and further delivered to, at least one electrical load. In one non-limiting aspect, the generator 14 can provide the electrical power to a power distribution system or power distributed network.

Non-limiting aspects of the generator 14 can be any combination of known generators. For example, the main machine 50 can be either a synchronous or asynchronous generator. In addition to the aspects described herein, additional component, devices, or the like can be included to provide secondary generator 14 operations or functions. For instance, in one non-limiting aspect of the disclosure, the generator 14 can include electromechanical accessories, or other accessories driven from the rotation of the rotatable shaft 40, including but not limited to, an oil pump, a fluid compressor, a hydraulic pump, or the like.

Further non-limiting aspects of the generator 14 can further include oil cooling or an oil cooling system for controlling the supply of oil to the oil cooling system. The cooling oil can be used to dissipate heat generated by the electrical and mechanical functions of the generator 14. The oil system can also provide for lubrication of the generator 14. In one non-limiting example, the cooling system 80 can further include, for example, a cooling fluid reservoir and various cooling passages. The rotatable shaft 40 can provide one or more flow channels or paths for the main machine rotor 52, exciter rotor 62, and PMG rotor 72. In one non-limiting example aspect of the cooling system 80, can receive a flow of cooling oil (shown as arrow 85) by way of a first port (e.g. 84 or 82) which can be provide via a generator interior 51 or coolant reservoir 86, to the rotatable shaft 40, to a shaft outlet port 91.

In a dry cavity generator, no cooling oil is permitted to contact the insulation system used in the generator 14. This dry cavity approach improves reliability over typical wet cavity designs in which oil is permitted to contact nonmetallic materials, such as the generator insulation system. In the dry cavity approach, the insulation system is not degraded because there is no direct impingement of hot oil on the windings. The workings of a generator 14 having a liquid cooled, dry cavity system are known in the art, which includes the disclosure in U.S. Pat. No. 7,687,928, issued Mar. 30, 2010, entitled Dual-Structured Aircraft Engine Starter/Generator, which is incorporated herein by reference. Aspects of the disclosure are applicable in either dry or wet cavity generator 14 system.

In the above mentioned aircraft generator, the PMG assembly 70 is used to power the stator 64 of the exciter 60. In addition to this PMG assembly 70, there are other PMG assemblies 70 used to power the on-board aircraft flight computers. Traditionally, each such PMG is in its own mechanical package and separate from the main electric generator in order to achieve the desired fault tolerance and redundancy for human carry aircraft. The separation adds weight and occupy space in the aircraft.

Figure 4:
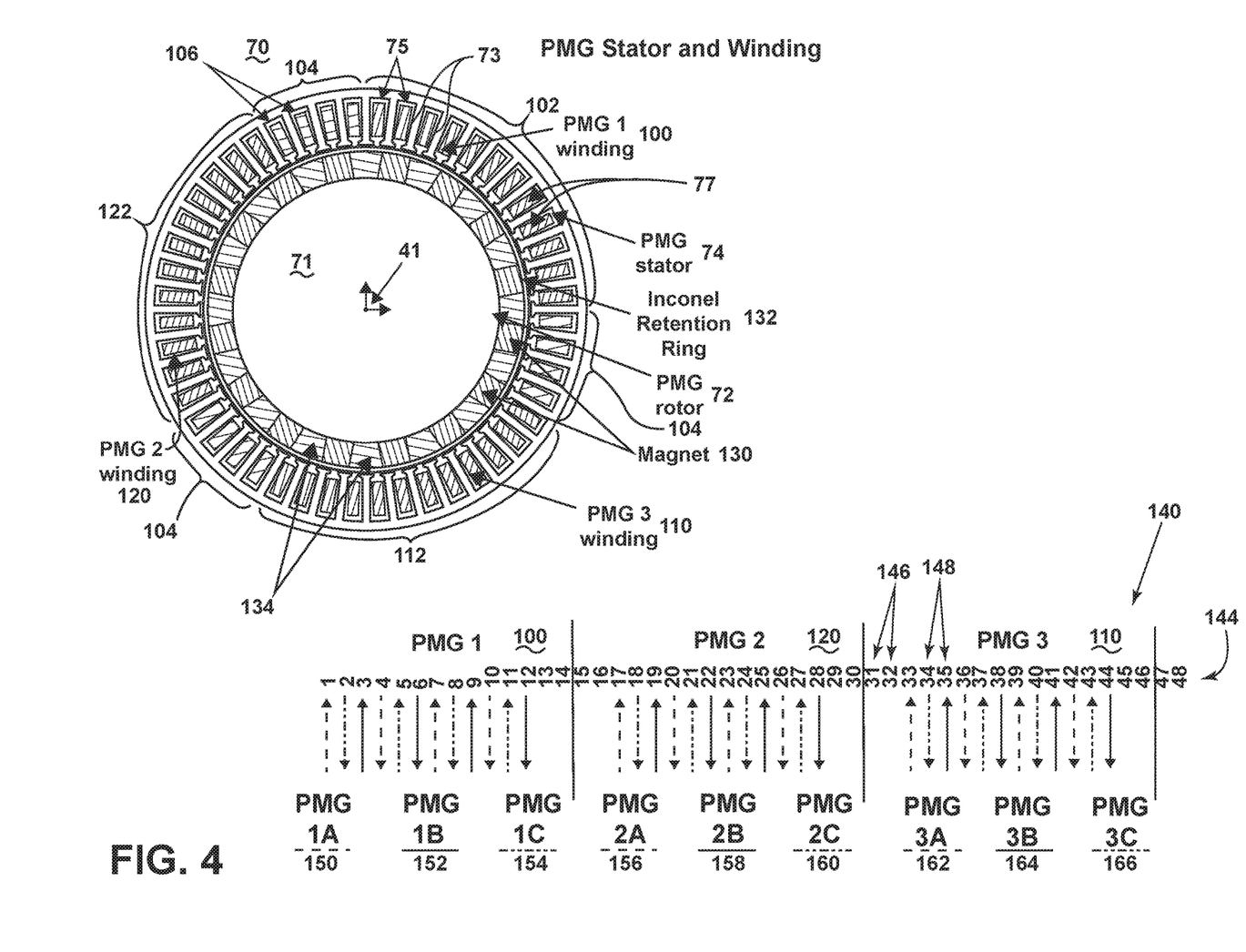
FIG. 4 is a schematic axial view of the PMG assembly and winding pattern of the generator of FIG. 2, in accordance with various aspects described herein.

FIG. 4 illustrates a schematic axial-facing view of the PMG assembly 70. As shown the PMG rotor assembly 72 is coaxially received within a PMG stator assembly 74. The PMG rotor assembly 72 can include a circumferentially-spaced set of similarly or commonly-oriented permanent magnets 130 fixedly arranged at the outer radius of the PMG rotor assembly 72, and spaced from one another by non-magnet spacing elements 134. In one non-limiting example, the PMG rotor assembly 72 can include a core 71 comprising a non-magnetic material, for example, for weight-saving or weight-reducing purposes.

The PMG stator assembly 74 includes a number of inwardly facing (relative to the axis of rotation 41) and circumferentially spaced set of posts 73 separating slots 75 between the set of posts 73. At least a subset of slots 75 can be wound with a set of conductive windings 77, as described herein. At least a different subset of slots 106 can be left empty, or for example, filled with non-conductive materials.

Different from the conventional PMG in an electrical machine, the PMG stator assembly 74 in the current disclosure can include three different sets of PMG stator windings, shown as a first set of PMG stator windings 100, a second set of PMG stator windings 120, and a third set of PMG stator windings 110. Each respective set of PMG stator windings 100, 110, 120 can be wound about a limited continuous circumferential portion of the PMG stator assembly 74, a limited continuous (e.g. continuously adjacent) subset of slots 75, or between a limited continuous (e.g. continuously adjacent) subset of posts 73. For instance, as illustrated, the first set of PMG stator windings 100 are wound about a limited continuous circumferential first portion 102 of the PMG stator assembly 74, the second set of PMG stator windings 120 are wound about a limited continuous circumferential first portion 122 of the PMG stator assembly 74, and the third set of PMG stator windings 110 are wound about a limited continuous circumferential first portion 112 of the PMG stator assembly 74. In one non-limiting example, the PMG rotor assembly 72 can include a retaining ring, shown for example as an Inconel retention ring 132, to ensure the fixing of the magnets 130 relative to the PMG rotor assembly 72.

Each of the first, second, and third PMG stator windings 100, 110, 120 can be spaced by a different a limited continuous (e.g. continuously adjacent) subset of slots 75, or between a limited continuous (e.g. continuously adjacent) subset of posts 73. For instance, as illustrated, each set of PMG stator windings 100, 110, 120 are spaced from one another by a limited continuous circumferential portion 104 of empty or non-conductive materials slot 106. In this sense, each of the set of PMG stator windings 100, 110, 120 are both mechanically isolated from each other (e.g. the first set of PMG stator windings 100 are mechanically spaced from the second set of PMG stator windings 120 by at least the empty or non-conductive material slots 106), as well as magnetically isolated from each other (e.g. the circumferential first portion 102 is circumferentially spaced from the circumferential second portion 122). Thus, a failure of one of the PMG power outputs (e.g. the power output of the first set of PMG stator windings 100) will not affect or impact another PMG power output (e.g. the power output of either the second or third set of PMG stator windings 120, 110).

Also illustrated in FIG. 4 is a winding diagram 140 illustrating one non-limiting example of the sets of stator windings 100, 110, 120 of the illustrated PMG stator assembly 70. The winding diagram 140 is arranged by numbering the slots 144 in a horizontal arrangement, and illustrating the respective phase windings of each respective set of PMG stator windings 100, 110, 120. For understanding, a "filled" slot 148 includes an arrow indicating a winding pattern, while an "unfilled," "empty," or "non-magnetic material filled" slot 146 is shown without an arrow.

In one non-limited example, slots 1, 4, 7, and 10 can be wound with a first phase winding (e.g. PMG 1A having line pattern 150, where "A" is the phase indication) of the first set of PMG stator windings 100. As noted, an "upward" arrow can indicate a first winding direction (e.g. aft to rear, with respect to the axial direction of the PMG stator assembly 74) while a "downward" arrow can indicate an opposing second winding direction (e.g. rear to aft, with respect to the axial direction of the PMG stator assembly 74). It will be understood that the directions of the windings can be varied in alternating patterns. In another example, slots 3, 6, 9, and 12 can be wound with a second phase winding (e.g. PMG 1B having line pattern 152, where "B" is the phase indication) of the first set of PMG stator windings 100, and slots 2, 5, 8, and 11 can be wound with a third phase winding (e.g. PMG 1C having line pattern 154, where "C" is the phase indication) of the first set of PMG stator windings 100.

For brevity, each winding and slot combination will not be described. The second set of PMG stator windings 120 can include PMG phase 2A having line pattern 156, PMG phase 2B having line pattern 158, and PMG phase 2C having line pattern 160. Similarly, the third set of PMG stator windings 110 can include PMG phase 3A having line pattern 162, PMG phase 3B having line pattern 164, and PMG phase 3C having line pattern 166.

Thus, in the illustrated example, each respective set of PMG stator windings 100, 110, 120 can include a respective three phases of power (A, B, and C) at the winding power output. As used herein, the phase designations "A," "B," and "C" are only used to refer to a different phase for a respective set of PMG stator windings (e.g. the first set of PMG stator windings 100). Different sets of PMG stator winding phases do not imply a common phase synchronization, arrangement, offset, output, or the like. For example, PMG 2B 158 does not denote any similarities is arrangement, configuration, or the like, relative to PMG 3B 164. In one non-limiting example, each phase of a respective set of PMG stator windings 100, 110, 120 can be offset by 120 degrees from one another. In additional non-limiting examples, the offset can be determined based on the number of PMG stator winding sets, slots, or the like.

Figure 5:
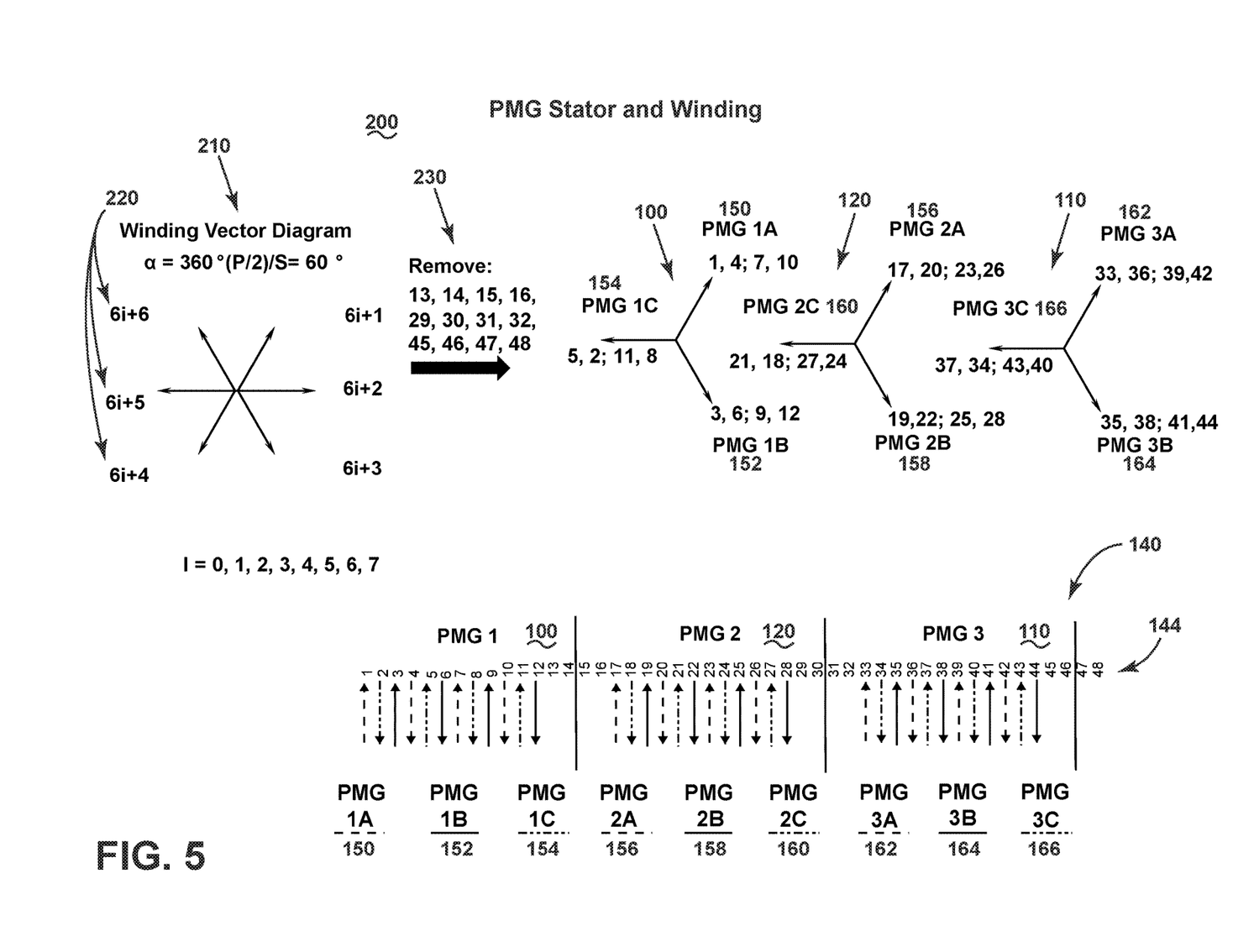
FIG. 5 is a schematic view of a set of vector diagrams for the PMG assembly of FIG. 4, in accordance with various aspects described herein.

FIG. 5 illustrates a schematic view of a set of vector diagrams 200 for the PMG assembly 70 of FIG. 4. As shown, a winding vector diagram 210 can illustrate one example arrangement to determine a slot 144 configuration. For example, as shown, a vector diagram of the first set of PMG stator windings 100 is shown to the PMG 1A phase 150 wound in slots 1, 4, 7, and 10. This example corresponds with the example equation shown in the winding vector diagram 210 and defined by vectors 220 6i+1 and opposingly 6i+4. For example, when i equals zero, the opposing vectors 220 identify the winding slots 1 and 4 (six times zero plus one equals one, and six times zero plus four equals four). Similarly, when i equals one, the opposing vectors 220 identify the winding slots 7 and 10 (six times one plus one equals seven, and six times one plus four equals ten). This winding vector diagram 210 can be utilized to identify or determine the slot 144 winding configuration shown in the winding diagram 140 for each respective phase and set of PMG stator winding 100, 110, 120 combination shown. The full set of winding slots and equation results will not be described for brevity.

FIG. 5 also identifies the "unfilled," "empty," or "non-magnetic material filled" slot 146 or the empty or non-conductive materials slot 106 as "removed" slots 230.

Figure 6:
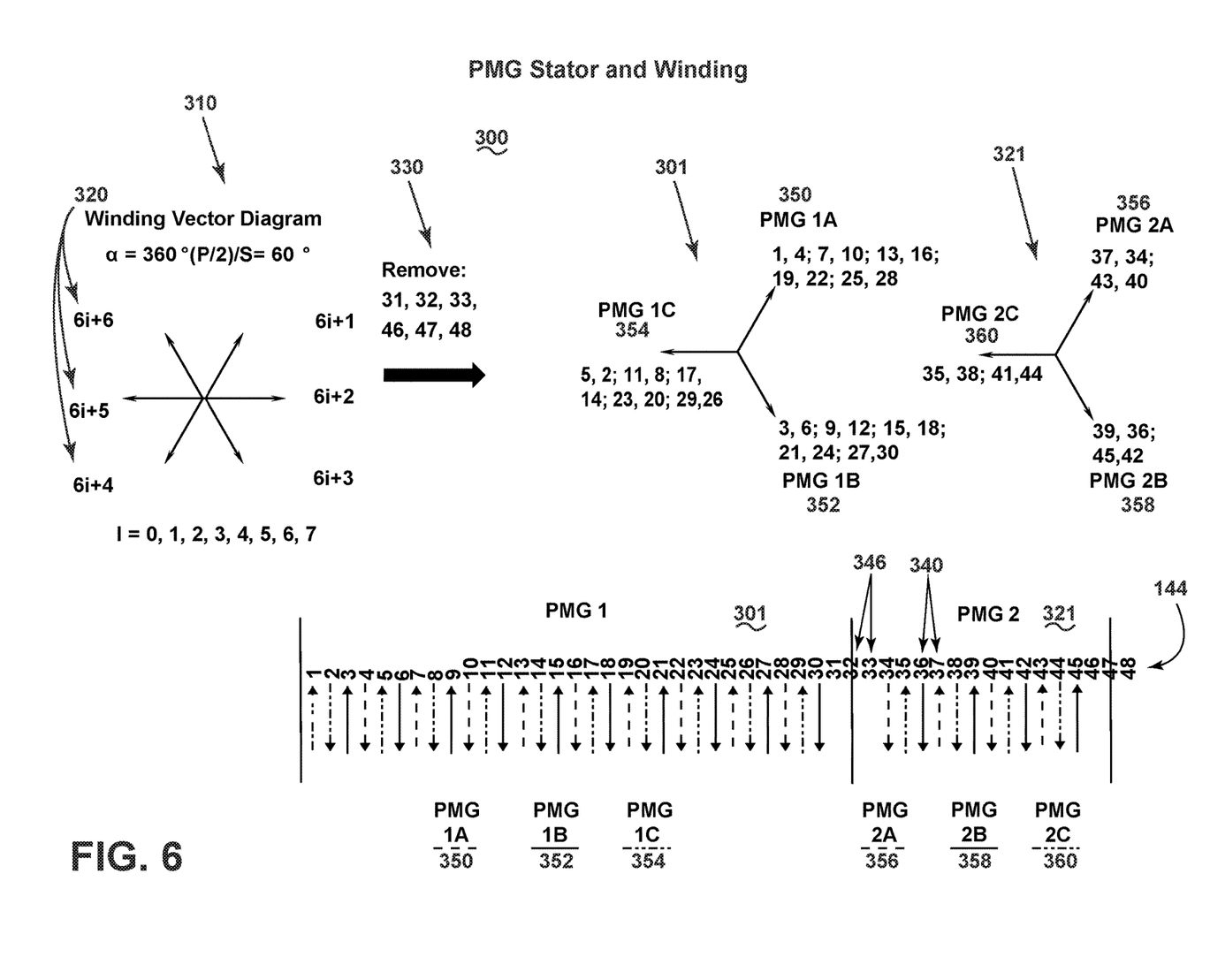
FIG. 6 is a schematic view of a set of vector diagrams for another PMG assembly, in accordance with various aspects described herein.

FIG. 6 illustrates a schematic view of a set of vector diagrams 300 for another PMG assembly (not shown). The PMG assembly represented by the set of vector diagrams and FIG. 6 can include only a first set of PMG stator windings 301 and a second set of PMG stator windings 321 (compared with three sets of PMG stator windings 100, 110, 120, in FIGS. 4 and 5). Also in this example, the first set of PMG stator windings 301 is larger, including additional phase windings PMG 1A 350, PMG 1B 352, and PMG 1C 354, compared with the sets of PMG stator windings 100, 110, 120 of FIGS. 4 and 5. In this sense, the first set of PMG stator windings 301 can be configured or adapted to generate a larger power output from the windings 301. Additionally, the circumferential portion of the PMG stator assembly 74 can be larger, compared with circumferential portions 102, 112, 122 of FIGS. 4 and 5.

The arrangement or configuration of the second set of PMG stator windings 321 (as well as the phases PMG 2A 356, PMG 2B 358 and PMG 2C 360) can be similar in size, circumferential portion, power output, or a combination thereof, compared with the aspects of FIGS. 4 and 5. The mechanical and magnetic separation between the first set of PMG stator windings 301 and the second set of PMG stator windings 321 can be similar to that shown in FIGS. 4 and 5 (e.g. the "empty," or "non-magnetic material filled" slot 146, 346, 330 is shown without an arrow in the slot 144 diagram, compared with "filled" slots 340).

As shown, a winding vector diagram 310 can illustrate one example arrangement to determine a slot 144 configuration. For example, as shown, a vector diagram of the first set of PMG stator windings 301 is shown to the PMG 1A phase 350 wound in slots 1, 4, 7, 10, 13, 16, 19, 22, 25, and 28, as shown by the vectors 320. The full set of winding slots and equation results will not be described for brevity.

Non-limiting examples of the disclosure can be included wherein at least a subset of the power outputs from respective sets of PMG stator windings 100, 110, 120, 301, 321 can be preselected, predetermined, or otherwise "assigned" to a specific electrical load or for a specific electrical purpose. For example, one power output from a respective set of PMG stator windings 100, 110, 120, 301, 321 can be configured to control synchronous operation of the generator 14, such as supplying the power output to the exciter stator 64. In another non-limiting example, a different power output from a respective set of PMG stator windings 100, 110, 120, 301, 321 can be configured to power a specific load, such as an essential or flight critical load, including but not limited to a vehicle management system (VMS), a vehicle management system (VMS), a flight computer (FC), or a combination thereof. In yet another instance, any permutation of power outputs can power a specific electrical load, a combination of specific electrical loads, or one or more specific electrical purposes. In this sense, any number of PMGs can be adapted or configured to supply a specific power output, as designed. Thus, aspects of the disclosure can be applicable for designing, building, arranging, manufacturing, or operating a PMG 70 wherein specific sets of PMG stator windings or power outputs thereof can be specifically assigned to a predetermined or preselected electrical load or electrical purpose.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

Furthermore while the set of stator windings 90 are schematically shown, multiple sets of stator windings 90, or multiple sets of stator windings 90 per stator core slot can be included. For instance, in one non-limiting example, at least two sets of stator windings 90 can be stacked, layered, embedded, installed, or wound about a stator slots 75. Non-limiting aspects of the disclosure can also be included wherein at least a subset of the stator windings 90 can include an external layer of electrically insulating material to electrically isolate the set of stator windings 90 from another set of stator windings 90 or the main machine stator or stator core slots 75.

The aforementioned aspects of the disclosure enable or provide a generator 14 having more than one power output of the PMG assembly. This enables high integration of multiple mechanically separate PMGs or multiple separate PMG rotor and stator sets with a single shaft into a single PMG, and results in significant weight saving, structure simplification, cost reduction, and efficiency improvement.

Alternatively, or in addition to the aforementioned benefit, the above-described aspects enable or provide a generator 14 that operate at a higher power density, or generate increased power levels. Yet another advantage of aspects of the disclosure is that the failure of a single PMG (e.g. PMG stator windings, or power output thereof) will not affect, damage, or otherwise change operation of the remaining PMGs, due to the mechanical and magnetic separations between the arrangements. Yet another advantage of the disclosure can be that certain electrical loads or electrical purposes can be "assigned" to a particular PMG power output. This can improve reliability for electrical loads, such as essential or flight critical loads, as the PMG power output is unlikely to fail even in the event of a power system disruption.

Many other possible aspects and configurations in addition to that shown in the above figures are contemplated by the present disclosure.

To the extent not already described, the different features and structures of the various aspects can be used in combination with each other as desired. That one feature cannot be illustrated in all of the figures or aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

1. A stator assembly, comprising:
   a cylindrical stator core;
   a circumferentially spaced set of posts extending from the stator core and defining a set of stator slots between adjacent posts;
   a first set of conductive windings wound about a first subset of stator slots in a first continuous circumferential portion of the stator core; and
   a second set of conductive windings wound about a second subset of stator slots in a second continuous circumferential portion of the stator core, and wherein the second continuous circumferential portion is different from the first continuous circumferential portion.

2. The stator assembly of any of the described aspects wherein the stator assembly is a permanent magnet generator stator assembly.

3. The stator assembly of any of the described aspects wherein a power output of the first set of conductive windings is preselected to control a synchronous operation of a generator including the permanent magnet generator stator assembly.

4. The stator assembly of any of the described aspects wherein a power output of the second set of conductive windings is preselected to connect to a specific electrical load.

5. The stator assembly of any of the described aspects wherein the specific electrical load is at least one of an essential load, a flight critical load, a vehicle management system, a vehicle management system, or a flight computer.

6. The stator assembly of any of the described aspects wherein a power output of the first set of conductive windings is connected with an exciter stator of a generator including the permanent magnet generator stator assembly.

7. The stator assembly of any of the described aspects wherein the first set of conductive windings further includes at least two conductive windings wound about the first subset of stator slots in the first continuous circumferential portion and are configured to generate a corresponding at least two phases of power at a power output of the at least two conductive windings.

8. The stator assembly of any of the described aspects wherein the first set of conductive windings includes three conductive windings would about the first subset of stator slots and are configured to generate three phase power at respective power outputs of the three conductive windings.

9. The stator assembly of any of the described aspects wherein the first continuous circumferential portion of the stator core is circumferentially spaced from the second circumferential portion of the stator core by at least one adjacent slot.

10. The stator assembly of any of the described aspects wherein the at least one adjacent slot is one of at least one empty adjacent slot or at least one adjacent slot having a non-conductive material within the slot.

11. The stator assembly of any of the described aspects wherein the first set of conductive windings and the second set of conductive windings are electrically isolated from one another.

12. The stator assembly of any of the described aspects wherein the first set of conductive windings and the second set of conductive windings are magnetically isolated from one another.

13. The stator assembly of any of the described aspects wherein the first set of conductive windings and the second set of conductive windings are mechanically isolated from one another.

14. The stator assembly of any of the described aspects wherein the first continuous circumferential portion extends about a larger circumferential portion of the stator core than the second continuous circumferential portion.

15. The stator assembly of any of the described aspects wherein the first set of conductive winding is configured to generate a larger power output than a power output of the second conductive winding.

16. A permanent magnet generator, comprising:
    a cylindrical rotor assembly having a set of circumferentially-spaced permanent magnets arranged at an outer radius of the rotor assembly, and spaced from one another by non-magnetic spacing element; and
    a stator assembly configured to coaxially receive the rotor assembly, and comprising:
      a cylindrical stator core;
      a circumferentially spaced set of posts extending from the stator core and defining a set of stator slots between adjacent posts;
      a first set of conductive windings wound about a first subset of stator slots in a first continuous circumferential portion of the stator core; and
      a second set of conductive windings wound about a second subset of stator slots in a second continuous circumferential portion of the stator core, and wherein the second continuous circumferential portion is different from the first continuous circumferential portion;
    whereby, the permanent magnet generator is configured to generate at least a first power output from the first set of conductive windings and a second power output from the second set of conductive windings when the rotor assembly is rotated relative to the stator assembly.

17. The permanent magnet generator of any of the described aspects wherein the first set of conductive windings further includes at least two conductive windings having a respective at least two power outputs, the at least two conductive windings wound about the first subset of stator slots in the first continuous circumferential portion and are configured to generate a corresponding at least two phases of power at the at least two power outputs when the rotor assembly is rotated relative to the stator assembly.

18. The permanent magnet generator of any of the described aspects wherein the first continuous circumferential portion of the stator core is circumferentially spaced from the second circumferential portion of the stator core by at least one adjacent slot.

19. The permanent magnet generator of any of the described aspects wherein the first continuous circumferential portion extends about a larger circumferential portion of the stator core than the second continuous circumferential portion.

20. The permanent magnet generator of any of the described aspects wherein the first power output is larger than the second power output.

What is claimed is:
1. A stator assembly, comprising:
   a cylindrical stator core;
   a circumferentially spaced set of posts extending from the stator core and defining a set of stator slots between adjacent posts;
   a first set of conductive windings wound about a first subset of stator slots in a first continuous circumferential portion of the stator core; and
   a second set of conductive windings wound about a second subset of stator slots in a second continuous circumferential portion of the stator core, and wherein the second continuous circumferential portion is different from the first continuous circumferential portion;
wherein the first continuous circumferential portion of the stator core is circumferentially spaced from the second circumferential portion of the stator core by at least one adjacent slot, and the at least one adjacent slot is one of at least one empty adjacent slot or at least one adjacent slot having a non-conductive material within the slot.

2. The stator assembly of claim 1 wherein the stator assembly is a permanent magnet generator stator assembly.

3. The stator assembly of claim 2 wherein a power output of the first set of conductive windings is preselected to control a synchronous operation of a generator including the permanent magnet generator stator assembly.

4. The stator assembly of claim 3 wherein a power output of the second set of conductive windings is preselected to connect to a specific electrical load.

5. The stator assembly of claim 4 wherein the specific electrical load is at least one of an essential load, a flight critical load, a vehicle management system, a vehicle management system, or a flight computer.

6. The stator assembly of claim 2 wherein a power output of the first set of conductive windings is connected with an exciter stator of a generator including the permanent magnet generator stator assembly.

7. The stator assembly of claim 1 wherein the first set of conductive windings further includes at least two conductive windings wound about the first subset of stator slots in the first continuous circumferential portion and are configured to generate a corresponding at least two phases of power at a power output of the at least two conductive windings.

8. The stator assembly of claim 7 wherein the first set of conductive windings includes three conductive windings would about the first subset of stator slots and are configured to generate three phase power at respective power outputs of the three conductive windings.

9. The stator assembly of claim 1 wherein the first set of conductive windings and the second set of conductive windings are electrically isolated from one another.

10. The stator assembly of claim 1 wherein the first set of conductive windings and the second set of conductive windings are magnetically isolated from one another.

11. The stator assembly of claim 1 wherein the first set of conductive windings and the second set of conductive windings are mechanically isolated from one another.

12. The stator assembly of claim 1 wherein the first continuous circumferential portion extends about a larger circumferential portion of the stator core than the second continuous circumferential portion.

13. The stator assembly of claim 12 wherein the first set of conductive winding is configured to generate a larger power output than a power output of the second conductive winding.

14. A permanent magnet generator, comprising:
a cylindrical rotor assembly having a set of circumferentially-spaced permanent magnets arranged at an outer radius of the rotor assembly, and spaced from one another by non-magnetic spacing element; and
a stator assembly configured to coaxially receive the rotor assembly, and comprising:
a cylindrical stator core;
a circumferentially spaced set of posts extending from the stator core and defining a set of stator slots between adjacent posts;
a first set of conductive windings wound about a first subset of stator slots in a first continuous circumferential portion of the stator core; and
a second set of conductive windings wound about a second subset of stator slots in a second continuous circumferential portion of the stator core, and wherein the second continuous circumferential portion is different from the first continuous circumferential portion;
wherein the first continuous circumferential portion of the stator core is circumferentially spaced from the second circumferential portion of the stator core by at least one adjacent slot, and the at least one adjacent slot is one of at least one empty adjacent slot or at least one adjacent slot having a non-conductive material within the slot; and
whereby, the permanent magnet generator is configured to generate at least a first power output from the first set of conductive windings and a second power output from the second set of conductive windings when the rotor assembly is rotated relative to the stator assembly.

15. The permanent magnet generator of claim 14 wherein the first set of conductive windings further includes at least two conductive windings having a respective at least two power outputs, the at least two conductive windings wound about the first subset of stator slots in the first continuous circumferential portion and are configured to generate a corresponding at least two phases of power at the at least two power outputs when the rotor assembly is rotated relative to the stator assembly.

16. The permanent magnet generator of claim 14 wherein the first continuous circumferential portion extends about a larger circumferential portion of the stator core than the second continuous circumferential portion.

17. The permanent magnet generator of claim 16 wherein the first power output is larger than the second power output.

* * * * *

UNITED STATES PATENT AND TRADEMARK OFFICE
CERTIFICATE OF CORRECTION

PATENT NO. : 11,211,836 B2
APPLICATION NO. : 16/402879
DATED : December 28, 2021
INVENTOR(S) : Hao Huang and Xiaochuan Jia Page 1 of 1

It is certified that error appears in the above-identified patent and that said Letters Patent is hereby corrected as shown below:

On the Title Page

Page 2, item (56) Foreign Patent Documents:
"(GN 107869038 A 4/2018)";
Should read:
-- CN 107869038 A 4/2018 --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*